(12) United States Patent
Machani

(10) Patent No.: US 10,063,579 B1
(45) Date of Patent: Aug. 28, 2018

(54) EMBEDDING THE CAPABILITY TO TRACK USER INTERACTIONS WITH AN APPLICATION AND ANALYZING USER BEHAVIOR TO DETECT AND PREVENT FRAUD

(71) Applicant: EMC Corporation, Hopkinton, MA (US)

(72) Inventor: Salah Machani, Toronto (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 15/196,160

(22) Filed: Jun. 29, 2016

(51) Int. Cl.
| H01L 29/06 | (2006.01) |
| G06F 3/0484 | (2013.01) |
| H04L 29/08 | (2006.01) |
| H04L 29/06 | (2006.01) |

(52) U.S. Cl.
CPC ........ H04L 63/1425 (2013.01); G06F 3/0484 (2013.01); H04L 67/22 (2013.01)

(58) Field of Classification Search
CPC .... H04L 63/1425; H04L 67/22; G06F 3/0484
See application file for complete search history.

(56) References Cited

U.S. PATENT DOCUMENTS

| 9,779,250 B1 * | 10/2017 | Hui ....................... G06F 21/577 |
| 9,798,883 B1 * | 10/2017 | Gil ........................ G06F 21/577 |
| 2004/0139353 A1 * | 7/2004 | Forcade ................. G06F 21/55 |
| | | 713/152 |
| 2007/0073519 A1 * | 3/2007 | Long ..................... G06F 11/3636 |
| | | 702/185 |
| 2009/0138592 A1 * | 5/2009 | Overcash ............ H04L 63/1425 |
| | | 709/224 |
| 2009/0320021 A1 * | 12/2009 | Pan ...................... G06F 11/0715 |
| | | 718/100 |
| 2010/0235918 A1 * | 9/2010 | Mizrahi .............. H04L 63/1416 |
| | | 726/25 |

(Continued)

OTHER PUBLICATIONS

Madden, Jack, "App wrapping or SDK for mobile application management? I'll take both, please!," BrianMadden.com, Oct. 1, 2012, «http://www.brianmadden.com/opinion/App-wrapping-or-SDK-for-mobile-application-management-Ill-take-both-please», TechTarget, pp. 1-2, article accessed Aug. 17, 2016.

(Continued)

*Primary Examiner* — Michael J Pyzocha
(74) *Attorney, Agent, or Firm* — BainwoodHuang

(57) ABSTRACT

Techniques for fraud detection based on user behavior that monitor and analyze user interactions with an application executing on an end user device. The techniques include monitoring behavior of an end user device user by tracking user interactions with the application executing on the end user device, and generating event records describing the user interactions and the times at which they occurred. The event records are sent to an analytics engine that uses the event records to perform a fraud detection operation by comparing the user interactions described in the event records to an expected pattern of user interactions with the application, and detecting anomalous user behavior indicative of fraud in response to the user interactions described in the event records not matching the expected pattern of user interactions with the application.

19 Claims, 4 Drawing Sheets

(56) References Cited

U.S. PATENT DOCUMENTS

| | | | | |
|---|---|---|---|---|
| 2014/0113588 A1* | 4/2014 | Chekina | ................ | G06F 21/552 455/410 |
| 2014/0137246 A1* | 5/2014 | Baluda | .................. | G06F 21/552 726/22 |
| 2015/0073894 A1* | 3/2015 | Leaute | ............... | G06Q 30/0248 705/14.47 |
| 2015/0256423 A1* | 9/2015 | Stearns | ................. | H04L 43/045 709/224 |
| 2015/0355957 A1* | 12/2015 | Steiner | ............... | G06F 11/0772 714/37 |
| 2016/0117500 A1* | 4/2016 | Li | .......................... | G06F 21/50 726/23 |
| 2016/0381057 A1* | 12/2016 | Das | .................... | H04L 41/0631 726/23 |
| 2017/0161478 A1* | 6/2017 | Stavrou | ................. | G06F 21/316 |
| 2017/0237766 A1* | 8/2017 | Mattson | .............. | H04L 63/1441 726/23 |
| 2017/0243223 A1* | 8/2017 | Kolotinsky | ........... | G06F 3/0484 |
| 2017/0359306 A1* | 12/2017 | Thomas | ................. | H04L 63/02 |

OTHER PUBLICATIONS

Montero-Luque, Carlos, "The science of app-wrapping," NetworkWorld, May 7, 2013, «http://www.networkworld.com/article/2166041/tech-primers/the-science-of-app-wrapping.html», pp. 1-4, article accessed Aug. 17, 2016.

Moriarty, Joe, "What is App Wrapping?," contentRAVEN, Jun. 11, 2013, «http://raven.contentraven.com/blog/bid/297554/What-is-App-Wrapping», pp. 1-6, article accessed Aug. 17, 2016.

\* cited by examiner

EMBEDDING THE CAPABILITY TO TRACK USER INTERACTIONS WITH AN APPLICATION AND ANALYZING USER BEHAVIOR TO DETECT AND PREVENT FRAUD

BACKGROUND

In the area of information technology security, effectively detecting and/or preventing fraudulent access to a secure resource may include determining whether the behavior of a user is consistent with the previous behavior of a legitimate user of the secure resource. When user behavior is inconsistent with the previous behavior of a legitimate user, such anomalous user behavior may be an indication that fraudulent access to the secure resource is being attempted or is currently occurring, e.g. that an imposter user or malicious software program is attempting to access or is currently accessing the secure resource.

Some previous fraud detection systems have attempted to monitor user behavior by intercepting and analyzing the contents of network traffic in communication channels established between a user device and a Web server. These previous systems have been effective for monitoring use of Web-based applications, since virtually every click performed by the user on the user device is reflected in the intercepted network traffic. For example, such previous systems have sometimes been able to determine and analyze the use of a Web site provided by a server computer, by intercepting and analyzing network traffic between the server providing the Web site and the user device.

Other previous systems have relied on monitoring behavioral biometrics ("behaviometrics") to continuously authenticate a user of a device based on one or more measurable behaviors that identify the user. For example, some previous systems have attempted to monitor behaviometrics of a mobile phone user by tracking how the user holds the mobile phone, e.g. the height at which the mobile phone is being held, the orientation of mobile phone, etc., in order to determine if the user currently in possession of the mobile phone is the legitimate user of the mobile phone.

SUMMARY

Unfortunately, previous approaches to monitoring user behavior for fraud detection and/or fraud prevention have significant shortcomings. First, previous systems that rely solely on interception and analysis of network traffic are significantly limited when attempting to monitor user interactions with applications that have been specifically developed for the user device ("native applications"), since many or even most user interactions with a native application are offline, and cannot be determined by simply intercepting and analyzing network traffic. As a result, data collected by previous systems from intercepted network traffic does not provide a sufficient basis for user behavior based fraud detection and/or prevention with regard to user interactions with native applications on the user device.

In previous behaviometrics based approaches, the underlying technology has been inefficient in terms of system resource utilization, especially in mobile devices. In addition, previous approaches based solely on behaviometrics have exhibited unacceptably high levels of inaccuracy (i.e. high false-accept and false-rejection rates).

To address these and other shortcomings of previous approaches, new techniques are disclosed herein for fraud detection based on user behavior that monitor and analyze user interactions with an application executing on an end user device. The disclosed techniques include monitoring behavior of an end user device user by tracking user interactions with an application executing on the end user device. The disclosed techniques for monitoring user interactions with an application executing on an end user device include detecting, by the application while the application executes on the end user device, each user interaction with the application that is performed by the user of the end user device. The monitoring disclosed herein also includes generating, by the application while the application executes on the end user device, for each user interaction with the application that is detected, an event record. The event record includes at least a description of the user interaction with the application, and a time stamp indicating a time at which the user interaction with the application occurred.

The event records generated by the application are sent to an analytics engine that uses the event records to perform a fraud detection operation. The fraud detection operation includes a) comparing the user interactions described in the event records to an expected pattern of user interactions with the application, and b) detecting anomalous user behavior indicative of fraud in response to the user interactions described in the event records not matching the expected pattern of user interactions with the application.

The event records may be sent to the analytics engine in a variety of different ways. In one example, each event record is sent directly to an external analytics server on which the analytics engine executes. In such an embodiment or configuration, the event records may each be sent immediately at the time they are generated for their respective events. Alternatively, all event records for a single application session may be collected at the end user device during the application session, and then transmitted together as a set to the analytics server when the application session ends (e.g. when the user logs out).

In another example the application executing on the end user device may provide a service to the user through the end user device in cooperation with server logic executing on a remote application server computer. Each event record may be sent from the end user device to the application server within the communications channel between the client application and the server logic. Agent logic executing on the application server computer forwards the event records received by the application server computer to the analytics server as they are received at the application server computer. The complete stream of information received by the application server computer from the end user device may be forwarded to the analytics server, or only the event records received from the application client.

The description of the corresponding user interaction contained in an individual event record may indicate various details of the corresponding user interaction. User interaction details may, for example, include a) the type of the corresponding user interaction, such as i) the user navigating from a first user interface element to a second user interface element in the user interface, ii) the user selecting a user interface element within the application user interface, iii) the user entering text or other data into the user interface, etc., b) identification of user interface elements within the application user interface that were part of the user interaction, such as a name or label of a text field into which data was entered, and/or c) user data such as a string or monetary value that was entered by the user into the application user interface during the user interaction, e.g. character string, monetary value, etc.

An event record may further include a device use indication that indicates how the user of the end user device physically interacted with the end user device at the time of the corresponding user interaction, and/or the physical state of the end user device while the corresponding user interaction was performed. Such device use indications may, for example, include indications of how hard, and/or for how long, the user pressed on a touch screen of the end user device when performing the user interaction, at what angle the end user device was held while the user interaction was performed, at what height the end user device was held while the user interaction was performed, and/or any other specific indication of device use that may be appropriate for a given deployment or implementation.

The expected pattern of user interactions with the application may indicate various aspects of how a legitimate user of the application has previously interacted with the application. For example, the expected pattern of user interactions may indicate how the legitimate user has previously navigated through user interface elements within the user interface of the application, and/or previous amounts of time between user interactions performed by the legitimate user, e.g. amounts of time between when the legitimate user navigated between user interface elements within the user interface of the application. Accordingly, the fraud detection operation may detect anomalous user behavior indicative of fraud in response to user interactions described in the event records not matching a sequence of user interface elements selected by the user (e.g. clicked on by the user), and/or amounts of time between when the user navigated to a specific user interface element within the application user interface, and when the user navigated away from that user interface element.

In another example, the expected pattern of user interactions may include or consist of a list of strings or a range of values that the legitimate user has previously entered into one or more fields within the user interface of the application. Accordingly, the fraud detection operation may detect anomalous user behavior indicative of fraud in response to the user interactions described in one or more event records indicating that the user of the end user device has entered a value into a field of the user interface that is outside the range of values previously entered by the legitimate user into the same field, or in response to one or more event records indicating that the user of the end user device has entered a string into a field of the user interface that is different from any string that the legitimate user previously entered into the same field.

In one embodiment, an application wrapping operation is performed on the application that embeds program logic into the application that enables the application to monitor the behavior of the user of the end user device by tracking user interactions with the application.

Embodiments of the disclosed techniques may provide significant advantages over previous approaches. For example, the disclosed techniques may be embodied such that, unlike systems that rely solely on interception and analysis of network traffic, substantially all of the user interactions with a native application executing on the end user device can be detected and analyzed. In this way a more extensive and rich set of user behavior data can be used as the basis for detecting anomalous user behavior than has been available to previous systems. In addition, the disclosed techniques may be embodied such that behaviometrics collection and/or analysis need not be relied on exclusively, and is not necessary or required, thus allowing the inefficiency and/or inaccuracy of previous behaviometrics based technologies to be avoided.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the scope of the invention is broader than the specific examples of embodiments disclosed herein.

Figure 1:
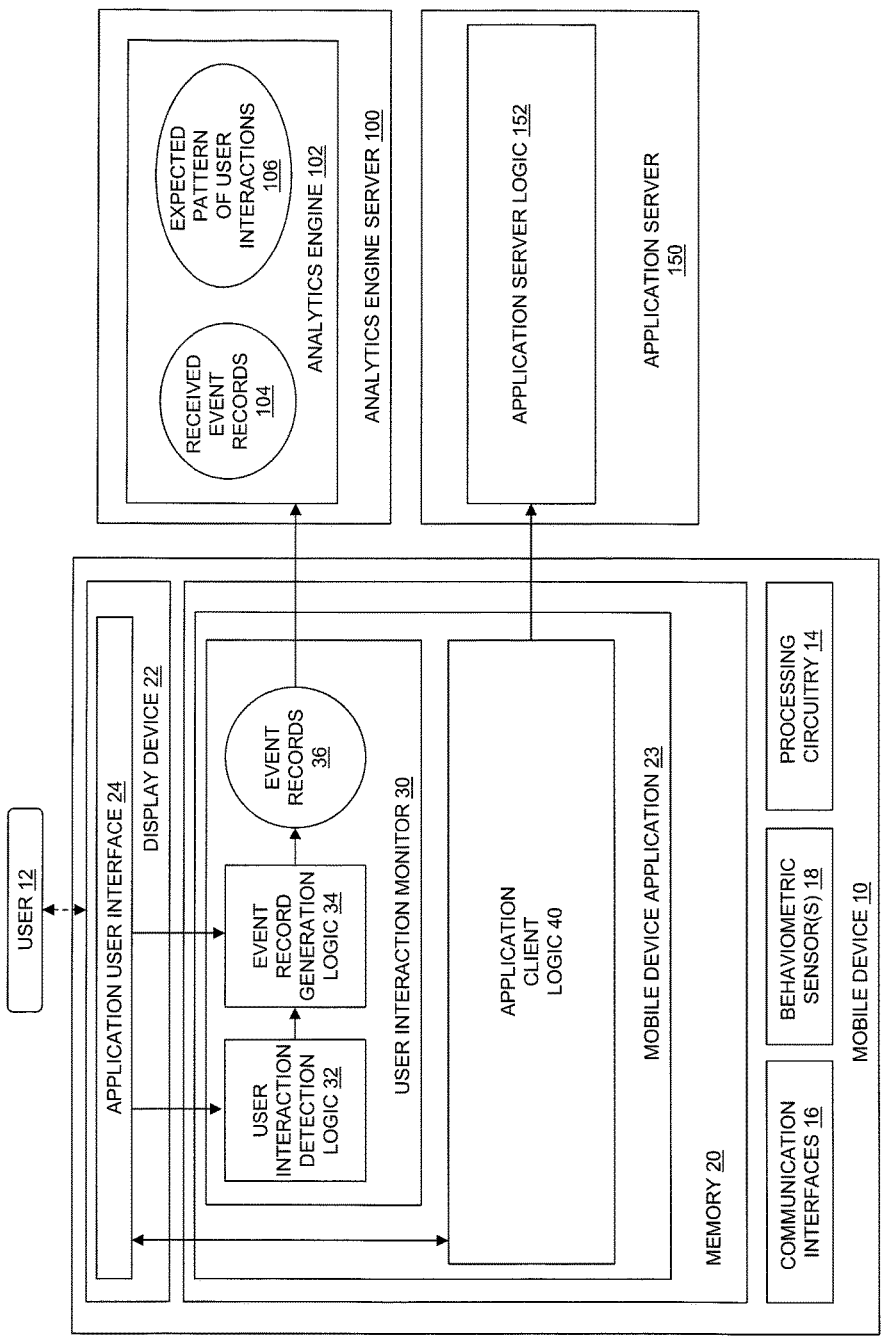
FIG. 1 is a block diagram showing an example of components in an illustrative embodiment operating to provide fraud detection based on user behavior by monitoring and analyzing user interactions with an application executing on an end user device, in an embodiment in which event records are sent from the end user device directly to an analytics engine.

FIG. 1 is a block diagram showing an example of components in an illustrative embodiment operating to provide fraud detection based on user behavior by monitoring and analyzing user interactions with an application executing on a Mobile Device 10, in an embodiment in which event records are sent from the Mobile Device directly to an Analytics Engine 102. The Mobile Device 10 shown in FIG. 1 is an example of an end user device, and may consist of or include any specific type of computerized electronic device, such as a desktop computer, laptop computer, tablet computer, smartphone, and/or personal digital assistant (PDA), and/or any other specific type of electronic device having electronics, software, one or more sensors that enable the collection of data samples, and network connectivity that enables the exchange of data with other devices.

In the example of FIG. 1, Mobile Device 10 includes Processing Circuitry 14, Communication Interfaces 16, Behaviometric Sensor(s) 18, Memory 20, and a Display Device 22. Display Device 22 may include or consist of any specific type of electronic visual display that is operable to present information in visual form, and in some embodiments may additionally include a touch screen or the like that is operable to receive user inputs. The Communication Interfaces 16 may, for example, include one or more network controllers that implements the electronic circuitry required to communicate using one or more physical layer and data link layer protocol standards such as Ethernet, Fibre Channel, Wi-Fi or Token Ring and for converting signals received over a computer network into electronic form for use by Mobile Device 10. The Communication Interfaces 16 enable Mobile Device 10 to communicate with Analytics Engine Server 100 and Application Server 150 over one or more computer networks. The Processing Circuitry 14 may, for example, include or consist of one or more microprocessors, e.g. central processing units (CPUs), multi-core processors, chips, and/or assemblies, and associated circuitry.

The Memory 20 may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on Processing Circuitry 14, and for storing data operated on by such program code. Program code executable on Mobile Device 10 is shown including a Mobile Device Application 23, which may include various specific program components and/or modules, etc. Mobile Device Application 23 is an example of an application to which the disclosed techniques may be applied, and may consist of or include any specific type of application program code, including but not limited to what is generally referred to as a "thick client" or "fat client" application running on Mobile Device 10, that independently provides a user interface and rich functionality to the user of Mobile Device 10. Mobile Device Application 23 may, for example, consist of or include a native application (also known as a "native app" or "mobile app") that is designed to run on mobile devices such as smartphones and/or tablet computers. In another example, Mobile Device Application 23 may alternatively consist of or include a thin client or a Web application that runs on a Web browser also executing in the Mobile Device 10. Other examples of applications to which the disclosed techniques may be applied include stand-alone applications and peer-to-peer applications.

For purposes of illustration and explanation with reference to FIG. 1, the components of Mobile Device Application 23 are shown to include User Interaction Detection Logic 32, Event Record Generation Logic 34, and Application Client Logic 40.

Those skilled in the art will recognize that while certain software constructs are specifically shown and described for purposes of explanation, the Memory 20 may additionally or alternatively include other software constructs, which are not shown in FIG. 1, such as an operating system, a Web browser, various other applications, and/or other processes.

Behaviometric Sensor(s) 18 may consist of or include any specific type of electronic sensor component or device operable to capture behaviometric measurements indicating how Mobile Device 10 is used by User 12 while performing user interactions with Mobile Device Application 23. For example, Behaviometric Sensor(s) 18 may consist of or include one or more sensor devices operable to capture behaviometric measurements indicating how User 12 physically interacts with Mobile Device 10 at the time User 12 performs user interactions with Mobile Device Application 23, and/or the physical state of Mobile Device 12 while user interactions are performed by User 12 with Mobile Device Application 23. Examples of device use indications that may be captured by Behaviometric Sensor(s) 18 may, for example, include indications of how hard (e.g. an amount of pressure), and/or for how long (e.g. an amount of time), User 12 presses on a touch screen of the Mobile Device 10 while performing a user interaction with Mobile Device Application 23. Other examples of device use indications that may be captured by Behaviometric Sensor(s) 18 may include without limitation the angle Mobile Device 10 was held while the user interaction was performed, the height at which the mobile device was held while User 12 performed a user interaction with Mobile Device Application 23, and/or any other specific indication of User 12's use of Mobile Device 10 that may be appropriate for a given deployment or implementation. Accordingly, Behaviometric Sensor(s) 18 may include or consist of various types of device orientation sensors, touch screen pressure sensors, etc.

Each one of Analytics Engine Server 100 and/or Application Server 150 may include or consist of an independent physical computer system, a blade server, or a virtual private server or cloud server, that is operable to execute program code. Each one of Analytics Server 100 and/or Application Server 150 may include or be allocated by an underlying computer system at least a portion of one or more communication interfaces, processing circuitry, and memory for storing various specific programs for execution on the processing circuitry. Communication interfaces of Analytics Engine Server 100 and/or Application Server 150 may, for example, include one or more network controllers that implements the electronic circuitry required to communicate using one or more physical layer and data link layer protocol standards such as Ethernet, Fibre Channel, Wi-Fi or Token Ring and for converting signals received over a computer network into electronic form for use by Mobile Device 10, and enable Analytics Engine Server 100 and Application Server 150 to communicate with each other and with Mobile Device 10 over one or more computer networks. Those skilled in the art will recognize that while for purposes of illustration and explanation an Analytics Engine 102 is shown executing on Analytics Server 100, and Application Server Logic 152 is shown executing on Application Server 150, Analytics Engine Server 100 and/or Application Server 150 may additionally execute other software, which are not shown in FIG. 1, such as an operating system, various other applications, and/or other processes.

The components shown in FIG. 1 operate to detect fraud based on user behavior by monitoring and analyzing user interactions performed by User 12 with Mobile Device Application 23 while Mobile Device Application 23 executes on Mobile Device 23. Execution of Mobile Device Application 23 on Mobile Device 10 may provide a service to User 12 through Application User Interface 24. For example, Mobile Device Application 23 may be a client application program that includes Application Client Logic 40 operable to provide a service to User 12 in cooperation with a server application program, such as Application Server Logic 152 executing on Application Server 152. The service may, for example, authenticate User 12 and then subsequently allow User 12 to access a secure resource through Application User Interface 24.

One example of a service that may be provided to User 12 with Application Client Logic 40 and Application Server Logic 152 is a banking service that allows User 12 to perform various transactions that access User 12's bank account, e.g. check balances, make withdrawals, transfer money between accounts, pay bills, etc. Any other specific type of service may be provided in the alternative or in addition.

In the example of FIG. 1, User Interaction Monitor 30 monitors the behavior of User 12 during execution of Mobile Device Application 23 by tracking user interactions performed by User 12 within the Application User Interface 24. User Interaction Detection Logic 32 detects each user interaction with Mobile Device Application 23 that is performed by User 12 through Application User Interface 24. User interactions that are detected by User Interaction Detection Logic 32 may include User 12 navigating between user interface elements in Application User Interface 24, and/or entering data into Application User Interface 24. For purposes of explanation herein, user interface elements in Application User Interface 24 may include windows, menus, icons, controls, tabs, or any other specific type of user selectable user interface element that may be provided in a graphical user interface such as Application User Interface 24.

For example, User Interaction Detection Logic 32 may detect when User 12 navigates from a first user interface element to a second user interface element within Application User Interface 24. The user interactions that are detected by User Interaction Detection Logic 32 may further include User 12 selecting (e.g. clicking on) a user interface element within Application User Interface 24. Another example of a user interaction that may be detected by User Interaction Detection Logic 32 may be the entry of text and/or other data by User 12 into a text field or the like within Application User Interface 24.

Further while Mobile Device Application 23 executes on Mobile Device 10, in response to the user interactions detected by User Interaction Detection Logic 32, Event Record Generation Logic 34 generates a corresponding event record for each detected user interaction. The generated event records are shown in FIG. 1 by Event Records 36. Each event record in Event Records 36 includes, for the corresponding detected user interaction, at least a description of the user interaction with Mobile Device Application 23, and a time stamp indicating a time at which the user interaction occurred.

In the embodiment of FIG. 1, the Event Records 36 generated by Event Record Generation Logic 34 are sent from Mobile Device 10 to Analytics Engine 102 executing on Analytics Engine Server 100. Analytics Engine 102 uses the event records received from Mobile Device 10, and shown by Received Event Records 104, to perform a fraud detection operation. The fraud detection operation performed by Analytics Engine 102 includes a) comparing the user interactions described in Received Event Records 104 to an expected pattern of user interactions with the application, shown for purposes of illustration in FIG. 1 by Expected Pattern of User Interactions 106. Analytics Engine Server 100 detects anomalous user behavior indicative of fraud in response to the user interactions described in Received Event Records 104 not matching Expected Pattern of User Interactions 106.

Expected Pattern of User Interactions 106 may indicate various aspects of how a legitimate user of Mobile Device Application 23 has previously interacted with Mobile Device Application 23, such as how the legitimate user has previously navigated through user interface elements within the Application User Interface 24, and/or previous amounts of time between user interactions performed by the legitimate user with Mobile Device Application 23, e.g. previous amounts of time between the legitimate user navigating to a user interface element within Application User Interface 24 and then navigating away from the same user interface element, and/or previous amounts of time between when the legitimate user entered text or other data into Application User Interface 24.

In one example, the fraud detection operation performed by Analytics Engine 102 may detect anomalous user behavior indicative of fraud in response to the sequence of user interface elements visited (e.g. selected) by the user not matching a previous sequence of user interface elements visited by the legitimate user.

For example, in the case in which Mobile Device Application 23 is a client application for an online banking service, Expected Pattern of User Interactions 106 may indicate that after logging in to Mobile Device Application 23, the legitimate user previously first navigated to a user interface element within Application User Interface 24 that enables the user to check their current account balance, and then navigated to a different user interface element in Application User Interface 24 that enables the user to initiate an online payment to one or more of a number of predefined payees. If the user interactions described by Received Event Records 104 indicate that after logging in to Mobile Device Application 23, User 12 navigated through a different sequence of user interface elements, e.g. first to a user interface element that enables the user to define a new payee, and then immediately to another user interface element that enables the user to make a payment to the newly defined payee, then Analytics Engine 102 would detect that the user interactions described by Received Event Records 104 do not match Expected Pattern of User Interactions 106, and Analytics Engine 102 would accordingly detect anomalous user behavior indicative of fraud.

In another example, the fraud detection operation performed by Analytics Engine 102 may detect anomalous user behavior indicative of fraud in response to the Received Event Records 104 describing user interactions that do not match Expected Pattern of User Interactions 106 in terms of the amount of time between when the user navigated to a user interface element within the Application User Interface 24, and when the user navigated away from that user element.

For example, the Expected Pattern of User Interactions 106 may include an expected time range that indicates a range of times that passed between when the legitimate user previously navigated to (e.g. selected or clicked on) a user interface element in Application User Interface 24 and when the legitimate user subsequently navigated away from that user interface element (e.g. selected or clicked on another user interface element). The fraud detection operation performed by Analytics Engine may detect anomalous user behavior indicative of fraud in response to the Received Event Records 104 indicating that an amount of time that passed between when the User 12 navigated to the user interface element and when User 12 navigated away from the user interface element is outside the expected time range.

In an example in which Mobile Device Application 23 is a client application for an online banking service, Expected Pattern of User Interactions 106 may indicate that the legitimate user previously always spent an amount of time within a first expected time range (e.g. between 15 and 30 seconds) after navigating to a first user interface element that enables the user to check their current account balance and/or inspect whether previously authorized payment have been made, before navigating to another user interface element. Expected Pattern of User Interactions 106 may further indicate that the legitimate user previously always spent an amount of time within a second expected time range (e.g. between 10-20 seconds) after navigating to a second user interface element that enables the user to initiate online payments to one or more of a number of predefined payees, before navigating to another user interface element. In an example in which Received Event Records 104 describes user interactions in which the amount of time between when User 12 navigated to the first user interface element and when User 12 navigated away from the first user interface element falls outside of the first expected time range, and/or in which the amount of time between when User 12 navigated to the second user interface element and when User 12 navigated away from the second user interface element falls outside of the second expected time range, then the user interactions described by Received Event Records 104 do not match Expected Pattern of User Interactions 106, and as a result Analytics Engine 102 detects anomalous user behavior indicative of fraud.

In another example, Analytics Engine Server 102 may detect anomalous user behavior indicative of fraud by detecting that the amount of time between user interactions described in Received Event Records 104 is so short that it indicates that Mobile Device Application 23 is likely to be under control of malware. For example, in a case in which the amount of time between all user interactions described in Received Event Records 104 is less than some minimum time threshold (e.g. one half second) contained in Expected Pattern of User Interactions 106, then the amount of time between user interactions described in Received Event Records 104 is shorter than it is generally possible for a human user to interact with an application such as Mobile Device Application 23, and therefore indicates that Mobile Device Application 23 is likely under the control of malware. As a result, the fraud detection operation performed by Analytics Engine Server 102 detects anomalous user behavior indicative of fraud.

In another example, the fraud detection operation performed by Analytics Engine 102 may detect anomalous user behavior indicative of fraud in response to user interactions described in the Received Event Records 104 indicating that a value entered by User 12 into a field within Application User Interface 24 does not fall within a range of values (e.g. contained in Expected Pattern of User Interactions 106) that have previously been entered by a legitimate user into the same field within Application User Interface 24. For example, Expected Pattern of User Interactions 106 may include a range of monetary values that have previously been entered by a legitimate user into a specific field of Application User Interface 24, and Analytics Engine 102 may detect when Received Event Records 104 indicate that User 12 has entered a monetary value into the same field of Application User Interface 24 that is outside that range of monetary values (e.g. has entered a monetary value of $10,000 dollars into a field in which the values previously entered by the legitimate user had never exceeded $500).

In another example, the fraud detection operation performed by Analytics Engine 102 may detect anomalous user behavior indicative of fraud in response to user interactions described in the Received Event Records 104 indicating that a character string entered by User 12 into a field within Application User Interface 24 does match any of the character strings in a list of the character strings (e.g. contained in Expected Pattern of User Interactions 106) that have previously been entered by a legitimate user into the same field within Application User Interface 24. For example, Expected Pattern of User Interactions 106 may include a list of user names or electronic mail addresses that have previously been entered by a legitimate user into a specific field of Application User Interface 24, and Analytics Engine 102 may detect when Received Event Records 104 indicate that User 12 has entered a name or electronic mail address value into the same field of Application User Interface 24 that is not contained in the list.

A fraud prevention action may be taken in response to Analytics Engine Server 100 detecting anomalous user behavior indicative of fraud. The specific fraud prevention action taken in a specific circumstance may be determined based on configuration settings in or associated with Analytics Engine 102. Examples of possible fraud detection actions include i) preventing access to any secure resources provided through Mobile Device Application 23, such as a bank account, etc., ii) requiring User 12 to perform additional verification steps through Application User Interface 24 prior to accessing a secure resource through Mobile Device Application 23, such as a) answer one or more CAPTCHA (Completely Automated Public Turing Tests to tell Computers and Humans Apart) or other challenge-response tests to verify that that Mobile Device Application 23 is being used by a human user, b) answer one or more challenge-response authentication questions that have answers that are known only by a legitimate user to verify that User 12 is a legitimate user and not an imposter, or c) provide a biometric sample, (e.g. fingerprint, etc.) in order to compare the biometric sample to a biometric template of the legitimate user to verify that User 12 is a legitimate user.

As shown in FIG. 1, Event Records 36 may be sent directly from Mobile Device 10 to Analytics Engine Server 100, on which Analytics Engine 102 executes. Individual event records may be sent from Mobile Device 10 to Analytics Engine Server 100 immediately at the time they are generated for their respective events. Alternatively, Event Record Generation Logic 34 may collect event records for an application session, during which User 12 uses Mobile Device Application 23, by starting to collect event records at the beginning of the session, e.g. when User 12 logs in to Mobile Device Application 23, and then continuing to collect event records during the session, until User 12 logs out from Mobile Device Application 23. At the time User 12 logs out from Mobile Device Application 23, User Interaction Monitor 30 transmits the complete set of event records collected during the application session to Analytics Engine Server 100. The Analytics Engine 102 may then use the complete set of event records to perform a post session analysis of the user interactions performed during the application by comparing the user interactions described in Received Event Records 104 with Expected Pattern of User Interactions 106.

Figure 2:
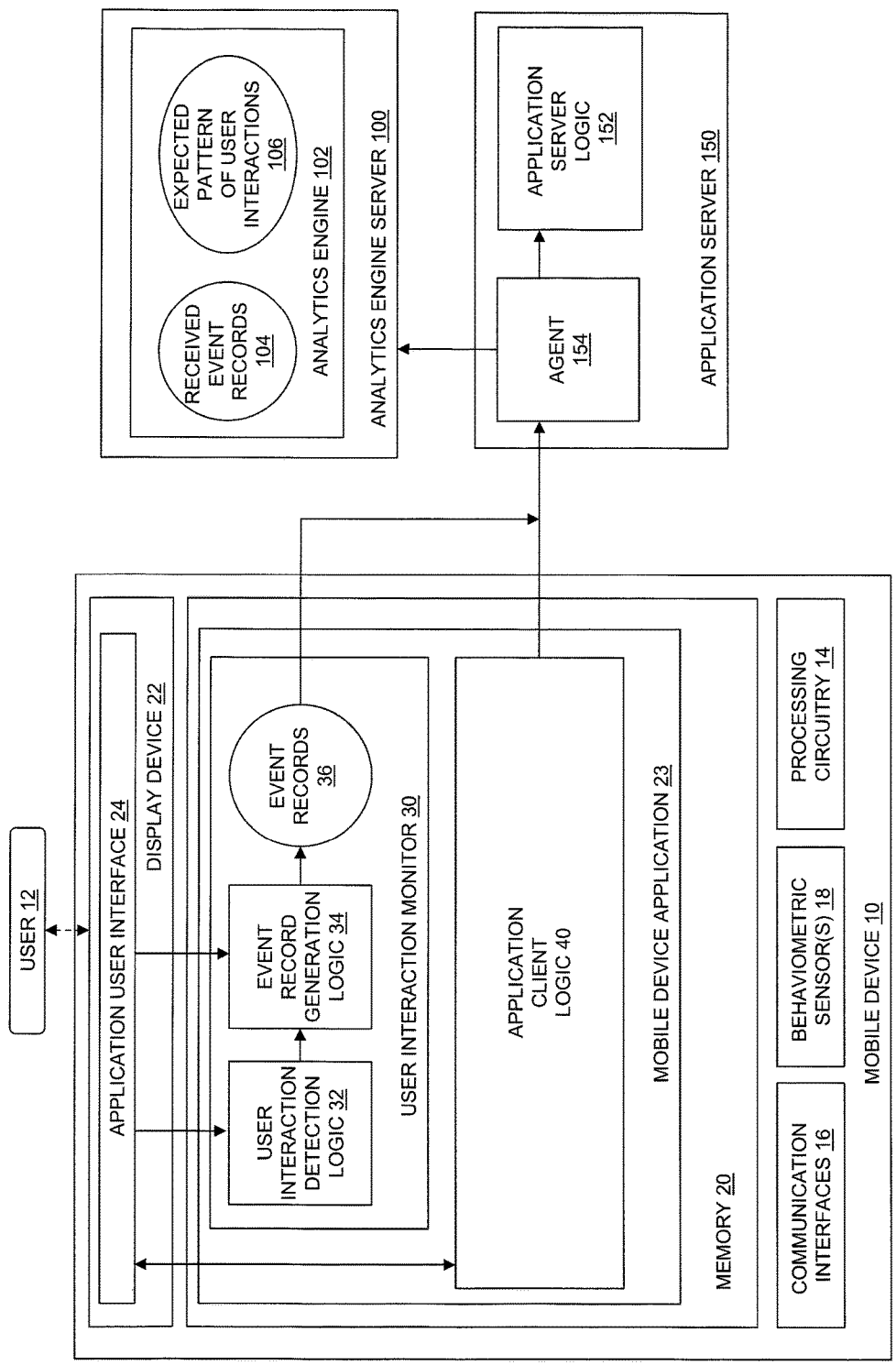
FIG. 2 is a block diagram showing an example of components in an illustrative embodiment operating to provide fraud detection based on user behavior by monitoring and analyzing user interactions with an application executing on an end user device, in an embodiment in which event records are inserted into communications between the end user device and a server computer system, and showing an agent on the server computer system forwarding the event records from the server computer system to the analytics engine.

In another example, FIG. 2 shows an embodiment in which event records are inserted into a communication channel between the Mobile Device 10 and Application Server 150. An Agent 154 executing on Application Server 150 intercepts the communications between Mobile Device 10 and Application Server 150, and forwards the event records received in the communication channel between Mobile Device 10 and Application Server 150 to Analytics Engine Server 100. The event records may be forwarded to Analytics Engine 102 by themselves in isolation, as extracted by Agent 154 from the information stream between Mobile Device 10 and Application Server 150, or together with and contained within the complete stream of all information conveyed between Mobile Device 10 and Application Server 150 that is intercepted by Agent 154.

Figure 3:
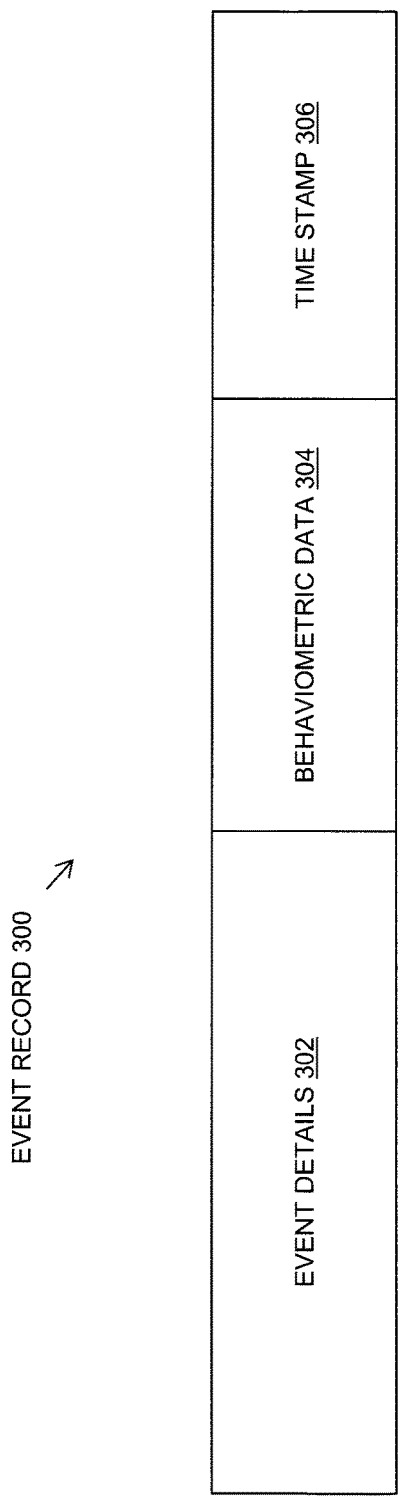
FIG. 3 is a block diagram showing an example of the contents of an event record.

FIG. 3 is a block diagram showing an example of the contents of an event record. As shown in FIG. 3, an Event Record 300 may include Event Details 302 that describe the corresponding user interaction, Behaviometric Data 304 that includes or consists of a device use indication that indicates how the user of the mobile device physically interacted with the mobile device at the time of the corresponding user interaction, and/or the physical state of the mobile device while the corresponding user interaction was performed, and a Time Stamp 306 that indicates the time at which the corresponding user interaction occurred. The disclosed system may also be embodied such that Event Record 300 includes only Event Details 302 and Time Stamp 306, while omitting Behaviormetric Data 304.

Event Details 302 may, for example, include a) an indication of the type of the corresponding user interaction, such as i) the user of the mobile device navigating from a first user interface element to a second user interface element in the user interface, ii) the user of the mobile device selecting a user interface element within the application user interface, and/or iii) the user of the mobile device entering text or other data into the user interface, b) an identification of user interface elements within the application user interface that were part of the user interaction, such as a name or label of a text field into which data was entered by the user of the mobile device, and/or c) user data such as a string or monetary value that was entered by the user of the mobile device into the application user interface during the user interaction, e.g. character string, monetary value, etc.

The device use indication in Behaviometric Data 304 may include a description or representation of one or more measurements that indicate how User 12 physically interacted with Mobile Device 10 at the time of the corresponding user interaction, and/or the physical state of Mobile Device 10 while the corresponding user interaction was performed. Such device use indications may, for example, include indications of how hard, or for how long, User 12 pressed on a touch screen of the Mobile Device 10 when performing the user interaction, at what angle Mobile Device 10 was held while the user interaction was performed, at what height Mobile Device 10 was held while the user interaction was performed, and/or any other specific indication of device use that may be appropriate for a given deployment or implementation. In an embodiment in which each event record includes Behaviometric Data 304, Expected Pattern of User Interactions 106 may include behaviometric data that is typical for a legitimate user of Mobile Device Application 23, such as how hard, and/or for how long, the legitimate user has typically pressed on the touch screen of Mobile Device Application 23, a typical angle at which the legitimate user holds Mobile Device 10, a typical height at which the legitimate user holds Mobile Device 10. In such an embodiment, comparing Received Event Records 104 to Expected Pattern of User Interactions 106 may include comparing behaviometric data in Received Event Records 104 to the typical behaviometric data for the legitimate user that is stored in Expected Pattern of User Interactions 106. The fraud detection operation performed by Analytics Engine 102 may detect anomalous user behavior indicative of fraud in response to behaviometric data in one or more event records in Received Event Records 104 not matching the behaviometric data stored in Expected Pattern of User Interactions 106 that is typical of the legitimate user.

Figure 4:
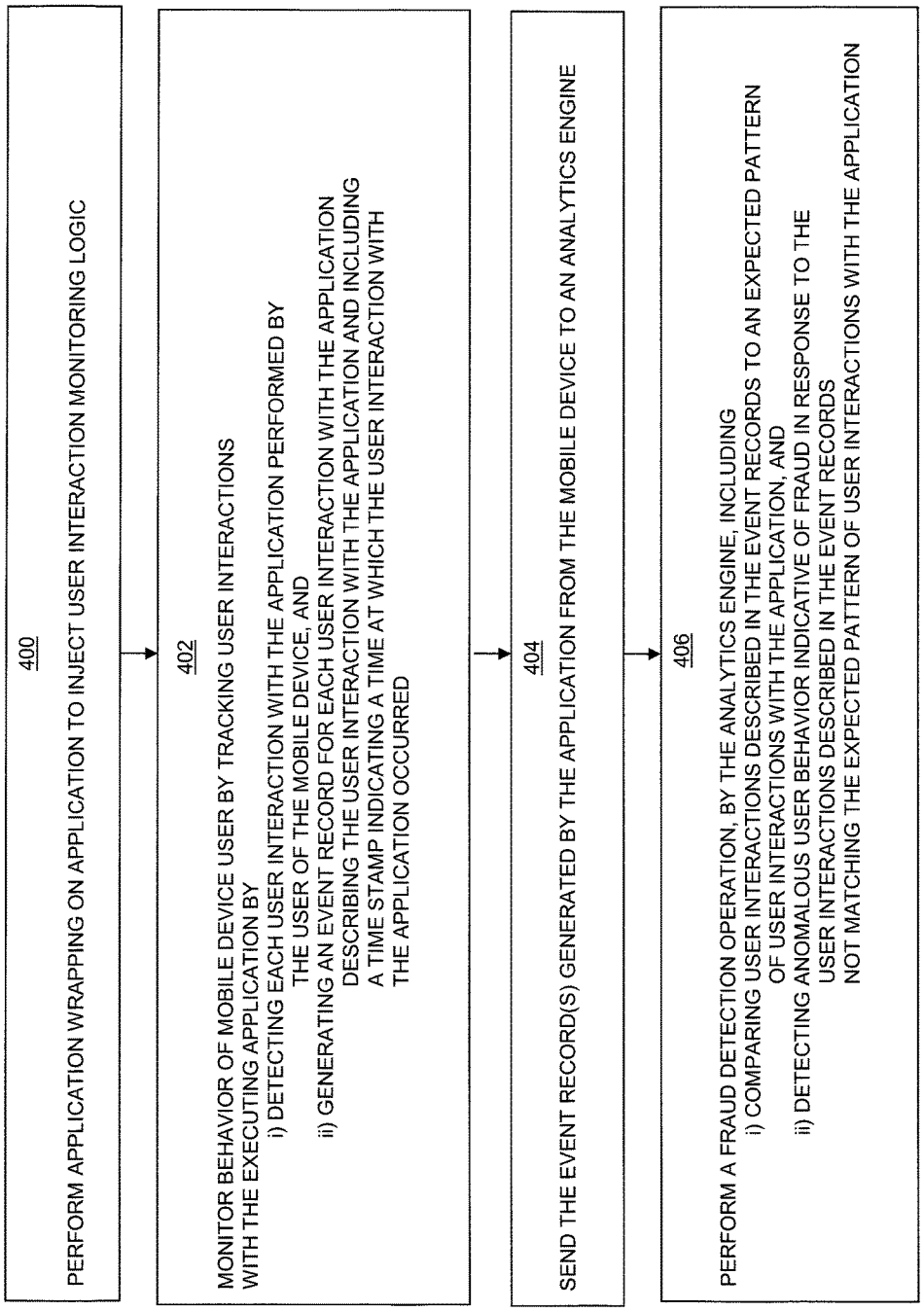
FIG. 4 is a flow chart showing steps performed during operation of an embodiment of the disclosed system to provide fraud detection based on user behavior by monitoring and analyzing user interactions with an application executing on an end user device.

FIG. 4 is a flow chart showing steps performed during operation of an embodiment of the disclosed system to provide fraud detection based on user behavior by monitoring and analyzing user interactions with an application executing on a mobile device. At step 400, an application wrapping operation is performed on Mobile Device Application 23 that embeds User Interaction Monitor 30 into Mobile Device Application 23, thus embedding program logic into Mobile Device Application 23 that enables Mobile Device Application 23 to monitor the behavior of User 12 by tracking user interactions with Mobile Device Application 23. The application wrapping operation of step 400 may be performed after Mobile Device Application 23 has been developed and deployed to Mobile Device 10, by dynamically adding a library that contains User Interaction Monitor 30 to an existing binary executable of Mobile Device Application 23 in Memory 20. At step 402, the behavior of User 12 is monitored by tracking user interactions with Mobile Device Application 23 while Mobile Device Application 23 is executing on Mobile Device 10 by i) detecting each user interaction with Mobile Device Application 23 performed by User 12, and ii) generating an event record for each user interaction with Mobile Device Application 23, each event record describing the corresponding user interaction with Mobile Device Application 23 and including a time stamp indicating a time at which the corresponding user interaction occurred.

At step 404 the event records generated at step 402 are sent from the Mobile Device 10 to the Analytics Engine 102 executing on Analytics Engine Server 100. At step 406 a fraud detection operation is performed, by the Analytics Engine 102, including at least i) comparing user interactions described in the Received Event Records 104 to an expected pattern of user interactions with Mobile Device Application 23, shown by Expected Pattern of User Interactions 106, and ii) detecting anomalous user behavior indicative of fraud in response to the user interactions described in the Received Event Records 104 not matching Expected Pattern of User Interactions 106.

The disclosed techniques may be embodied to provide significant advantages over previous approaches. For example, embodiments of the disclosed techniques advantageously does not rely solely on interception and analysis of network traffic, and accordingly substantially all user interactions with a native application executing on the end user device can be detected and analyzed. As a result, a more extensive and rich set of user behavior data can be used as the basis for detecting anomalous user behavior than has been available to previous systems. In addition, embodiments of the disclosed techniques do not require behaviometrics collection and/or analysis, thus avoiding the inefficiency and/or inaccuracy of previous technologies that relied exclusively on behaviometrics data.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, while in the above examples reference is made to an online banking application, the disclosed techniques are not so limited. Accordingly, those skilled in the art will recognize that the disclosed techniques are applicable to various specific types of mobile applications.

In another example, while in the above examples reference is made to performing an application wrapping operation to embed User Interaction Monitor 30 into Mobile Device Application 23, the disclosed techniques are not limited to such an embodiment. Alternatively, User Interaction Monitor 30 may be provided as part of a software development kit (SDK), and included into Mobile Device Application 23 at development time.

In another example, while in the above examples reference is made to an analytics engine that executes remotely from the end user device (e.g. on Analytics Engine Server 100), the disclosed techniques are not limited to such an embodiment. Alternatively, the Analytics Engine 102 may be provided in whole or in part as program code contained in and executing on the end user device, e.g. within Memory 20 of Mobile Device 10 and executing on Processing Circuitry 14.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of detecting fraud based on user behavior, the method comprising:

monitoring behavior of a user of an end user device by tracking user interactions with an application executing on the end user device, wherein the application comprises a client application that provides a service to the user of the end user device through an application user interface presented in a display device of the end user device in cooperation with a server application located on a remote application server, and wherein the service provided by the client application in corporation with the server application includes providing access to at least one secure resource, the monitoring including detecting, by the application while the application executes on the end user device, each user interaction with the application performed by the user of the end user device, and generating, by the application while the application executes on the end user device, for each detected user interaction with the application, an event record, the event record including a description of the user interaction with the application and a time stamp indicating a time at which the user interaction with the application occurred;

in response to detecting an end of an application session during which the user of the end user device used the service provided by the client application in cooperation with the service application, transmitting the event records generated by the application to an analytics engine, wherein the analytics engine is located on an analytics engine server that is separate and independent from both the remote application server and the end user device;

performing a fraud detection operation, by the analytics engine on the analytics engine server, wherein the fraud detection operation includes a) comparing user interactions described in the event records to an expected pattern of user interactions with the application, and b) detecting anomalous user behavior indicative of fraud in response to the user interactions described in the event records not matching the expected pattern of user interactions with the application; and in response to the fraud detection operation performed by the analytics engine on the analytics engine server, controlling access by the user of the end user device to the secure resource to which access is provided through the service that is provided by the client application in corporation with the server application by preventing the user of the end user device from accessing the secure resource in response to the analytics engine detecting anomalous user behavior indicative of fraud.

2. The method of claim 1, wherein transmitting the event records generated by the application to the analytics engine includes transmitting each event record directly to the analytics engine server.

3. The method of claim 1, further comprising:
collecting, during the application session during which the user of the end user device used the application, a set of event records for the application session, wherein the set of event records for the application session includes an event record corresponding to each detected user interaction with the application performed by the user of the end user device during the application session; and
wherein transmitting the event records generated by the application to the analytics engine comprises transmitting the set of event records for the application session directly to the analytics engine server in response to detecting the end of the application session.

4. The method of claim 1,
wherein transmitting the event records generated by the application to the analytics engine includes i) sending the event records from the end user device to the remote application server computer, and ii) agent logic executing on the application server computer forwarding event records received by the application server computer to the analytics engine server on which the analytics engine executes.

5. The method of claim 1, wherein the expected pattern of user interactions with the application includes at least one sequence of user interface elements in the user interface of the application previously visited by a legitimate user; and
wherein the fraud detection operation detects anomalous user behavior indicative of fraud in response to the event records indicating that the user of the end user device visited a sequence of user interface elements in the user interface of the application that does not match the sequence of user interface elements in the user interface of the application previously visited by the legitimate user.

6. The method of claim 5, wherein the expected pattern of user interactions with the application further includes an expected time range that indicates a range of times that passed between when the legitimate user navigated to a user interface element in the user interface of the application and when the legitimate user navigated away from the user interface element; and
wherein the fraud detection operation detects anomalous user behavior indicative of fraud in response to the event records indicating that an amount of time that passed between when the user of the end user device navigated to the user interface element and when the user of the end user device navigated away from the user interface element is outside the expected time range.

7. The method of claim 6, wherein the expected pattern of user interactions with the application further includes an minimum time threshold; and
wherein the fraud detection operation detects anomalous user behavior indicative of fraud in response to the event records indicating that an amount of time that passed between user interactions is less than the minimum time threshold.

8. The method of claim 1, further comprising performing an application wrapping operation on the application that embeds program logic into the application that enables the application to monitor the behavior of the user of the end user device by tracking user interactions with the application executing on the end user device.

9. The method of claim 8, wherein the application wrapping operation is performed on the application after the application has been deployed to the end user device.

10. The method of claim 9, wherein the application wrapping operation dynamically adds a library to a binary executable of the application; and
wherein the library includes program code operable to i) monitor the behavior of the user of the end user device by tracking user interactions with the application executing on the end user device, and ii) transmit event records to the analytics engine.

11. A system for detecting fraud based on user behavior, comprising:
an end user device having memory, processing circuitry coupled to the memory, and program code stored in the memory of the end user device for detecting fraud based on user behavior which, when executed by the processing circuitry of the end user device, causes the processing circuitry of the end user device to:
monitor behavior of a user of the end user device by tracking user interactions with an application executing on the end user device, wherein the application comprises a client application that provides a service to the user of the end user device through an application user interface presented in a display device of the end user device in cooperation with a server application located on a remote application server, and wherein the service provided by the client application in corporation with the server application includes providing access to at least one secure resource, at least in part by
detecting, by the application while the application executes on the end user device, each user interaction with the application performed by the user of the end user device, and
generating, by the application while the application executes on the end user device, for each detected user interaction with the application, an event record, the event record including a description of the user interaction with the application and a time stamp indicating a time at which the user interaction with the application occurred; and
in response to detecting an end of an application session during which the user of the end user device used the service provided by the client application in cooperation with the service application, transmit the event records generated by the application to an analytics engine, wherein the analytics engine is located on an analytics engine server that is separate and independent from both the remote application server and the end user device;
wherein the analytics engine includes analytics engine program code which, when executed by processing circuitry on the analytics engine server performs a fraud detection operation, at least in part by a) comparing user interactions described in the event records to an expected pattern of user interactions with the application, and b) detecting anomalous user behavior indicative of fraud in response to the user interactions described in the event records not matching the expected pattern of user interactions with the application; and
wherein the program code stored in the memory of the end user device for detecting fraud based on user behavior, when executed by the processing circuitry of the end user device, further causes the processing circuitry of the end user device to, in response to the fraud detection operation performed by the analytics engine on the analytics engine server, control access by the user of the end user device to the secure resource to which access is provided through the service that is provided by the client application in corporation with the server application by preventing the user of the end user device from accessing the secure resource in response to the analytics engine detecting anomalous user behavior indicative of fraud.

12. The system of claim 11, wherein the event records generated by the application are transmitted from the end user device to the analytics engine by transmitting each event record directly to the analytics engine server.

13. The system of claim 11, wherein the program code stored in the memory of the end user device, when executed by the processing circuitry of the end user device, further causes the processing circuitry of the end user device to collect, during the application session during which the user of the end user device used the application, a set of event records for the application session, wherein the set of event records for the application session includes an event record corresponding to each detected user interaction with the application performed by the user of the end user device during the application session; and wherein the event records generated by the application are transmitted from the end user device to the analytics engine by transmitting the set of event records for the application session directly to the analytics engine server in response to detecting the end of the application session.

14. The system of claim 11,
wherein the event records generated by the application are transmitted to the analytics engine by i) sending the event records from the end user device to the remote application server computer, and ii) agent logic executing on the application server computer forwarding event records received by the application server computer to the analytics engine server on which the analytics engine executes.

15. The system of claim 11, wherein the expected pattern of user interactions with the application includes at least one sequence of user interface elements in the user interface of the application previously visited by a legitimate user; and wherein the fraud detection operation performed by the analytics engine program code detects anomalous user behavior indicative of fraud in response to the event records indicating that the user of the end user device visited a sequence of user interface elements in the user interface of the application that does not match the sequence of user interface elements in the user interface of the application previously visited by the legitimate user.

16. The system of claim 15, wherein the expected pattern of user interactions with the application further includes an expected time range that indicates a range of times that passed between when the legitimate user navigated to a user interface element in the user interface of the application and when the legitimate user navigated away from the user interface element; and wherein the fraud detection operation performed by the analytics engine program code detects anomalous user behavior indicative of fraud in response to the event records indicating that an amount of time that passed between when the user of the end user device navigated to the user interface element and when the user of the end user device navigated away from the user interface element is outside the expected time range.

17. The system of claim 16, wherein the expected pattern of user interactions with the application further includes an minimum time threshold; and wherein the fraud detection operation performed by the analytics engine program code detects anomalous user behavior indicative of fraud in response to the event records indicating that an amount of time that passed between user interactions is less than the minimum time threshold.

18. The system of claim 11, wherein program logic that enables the application to monitor the behavior of the user of the end user device by tracking user interactions with the application executing on the end user device is embedded into the application after the application is deployed to the end user device by way of an application wrapping operation.

19. A computer program product having a non-transitory computer readable medium which stores a set of instructions operable to detect fraud based on user behavior, the set of instructions, when executed by processing circuitry, causing the processing circuitry to:

monitor behavior of a user of an end user device by tracking user interactions with an application executing on the end user device, wherein the application comprises a client application that provides a service to the user of the end user device through an application user interface presented in a display device of the end user device in cooperation with a server application located on a remote application server, and wherein the service provided by the client application in corporation with the server application includes providing access to at least one secure resource, at least in part by detecting, by the application while the application executes on the end user device, each user interaction with the application performed by the user of the end user device, and generating, by the application while the application executes on the end user device, for each detected user interaction with the application, an event record, the event record including a description of the user interaction with the application and a time stamp indicating a time at which the user interaction with the application occurred;

in response to detecting an end of an application session during which the user of the end user device used the service provided by the client application in cooperation with the service application, transmit the event records generated by the application to an analytics engine, wherein the analytics engine is located on an analytics engine server that is separate and independent from both the remote application server and the end user device;

perform a fraud detection operation, by the analytics engine on the analytics engine server wherein the fraud detection operation includes a) comparing user interactions described in the event records to an expected pattern of user interactions with the application, and b) detecting anomalous user behavior indicative of fraud in response to the user interactions described in the event records not matching the expected pattern of user interactions with the application; and in response to the fraud detection operation performed by the analytics engine on the analytics engine server, control access by the user of the end user device to the secure resource to which access is provided through the service that is provided by the client application in corporation with the server application by preventing the user of the end user device from accessing the secure resource in response to the analytics engine detecting anomalous user behavior indicative of fraud.

* * * * *